3,262,504
TRASH CLEARING PLOW ATTACHMENT
Raymond George Force, R.R. 2, Gettysburg and Pitsburg
Road, Greenville, Ohio
Filed June 1, 1964, Ser. No. 371,399
5 Claims. (Cl. 172—45)

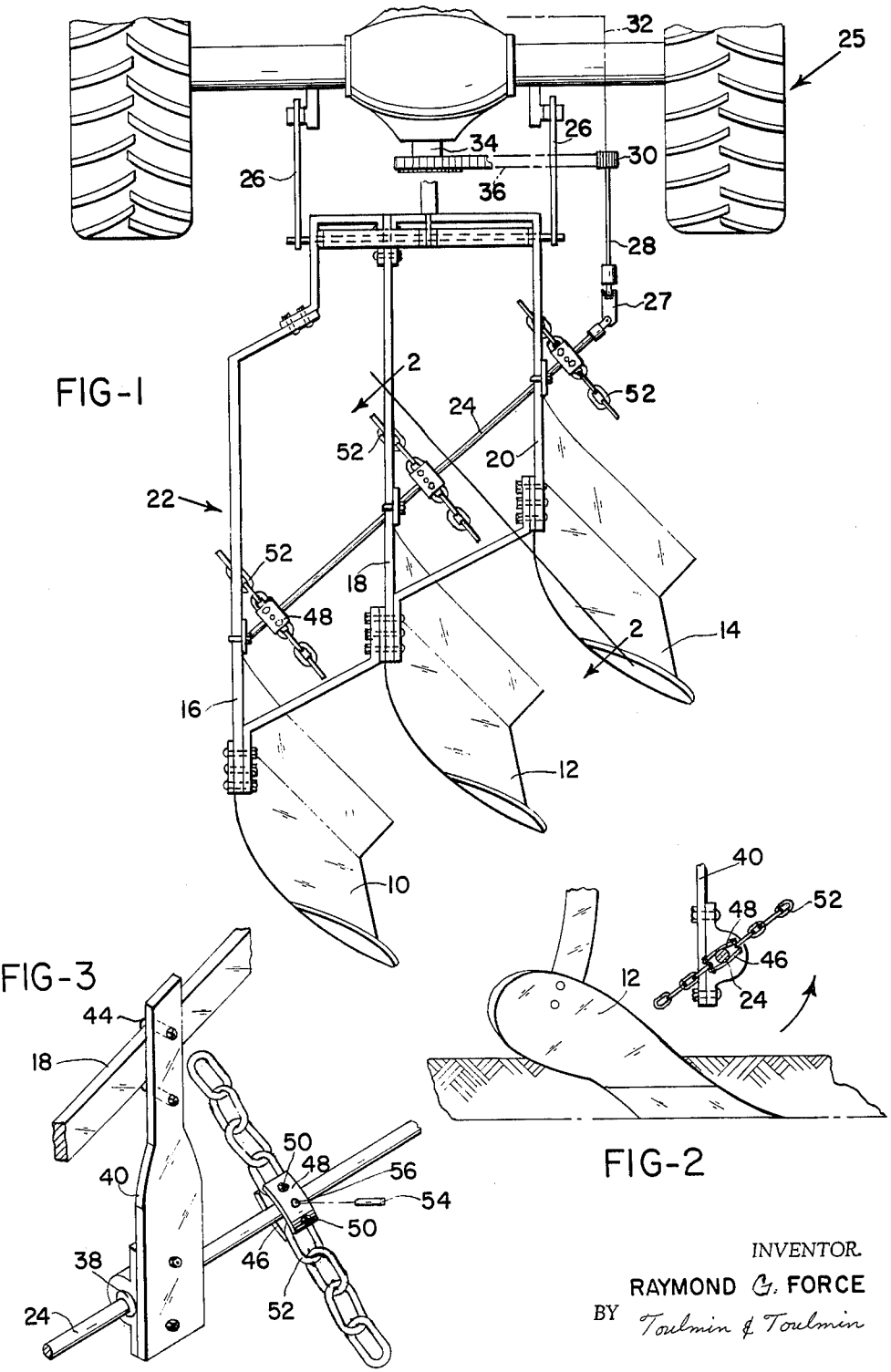

This invention relates to agricultural equipment and in particular to a device for use with a plow for keeping the plow free of trash.

In the plowing of fields, in particular where there is considerable vegetation or trash, it is not uncommon for the trash to accumulate on the plow and clog up in front of the plow beam. This necessitates stopping the plowing operation and manually removing the trash from the plow. Devices are known which mount on top of the plow bottom and deflect dirt downwardly in front of the plow and thereby effect covering of a great deal of the trash and vegetation in the path of the plow. At times however these devices are insufficient for keeping the plow cleared, and, at best, can only handle relatively low vegetation or short lengths of trash.

With the foregoing in mind, a primary object of the present invention is the provision of a device for use with a plow which will prevent any accumulation of trash or vegetation in the plow structure during a plowing operation.

Another object of this invention is the provision of a device of the nature referred to which is relatively simple and which can be adapted to substantially any plow structure, including multiple bottom plows.

A still further object of the present invention is the provision of a trash clearing attachment for plows which can be mounted on substantially any plow structure and which can be adjusted to meet the particular clearing situation presented by the region being plowed.

A particular object of the present invention is the provision of a trash and vegetation clearing attachment for plows which has a live action and thus effects clearing of the path of the plow in advance of the turning of the spoil by the plow.

These and other objects and advantages of this invention will become more apparent upon reference to the following specification taken in connection with the accompanying drawings, in which:

FIGURE 1 is a somewhat diagrammatic plan view of a three-bottom plow provided with a clearing attachment according to the present invention;

FIGURE 2 is a view looking in on line 2—2 in FIGURE 1 and showing more in particular the relationship of the clearing attachment to the plow bottom; and FIGURE 3 is a perspective view showing a more detailed construction of the clearing attachment and the manner in which it is mounted on the frame of the plow structure.

Referring to the drawings somewhat more in detail, in FIGURE 1 there is shown a multiple bottom plow having bottoms 10, 12 and 14 carried on the beams 16, 18 and 20 respectively which are integrally interconnected and placed relative to each other to form a frame structure 22. This frame structure is connected to a tractor 25 by any suitable hitch means which is not shown in detail except for the drawbar elements 26. A hitch of this nature maintains the plow at the proper level and also provides means for lifting and carrying the plow while transmitting draft from the tractor to the plow.

According to the present invention, there is carried in frame 22 a shaft 24 extending through the frame under the plow bottom supporting beams and at a level so that the shaft will be above the normal surface of the region being plowed and in front of the respective plow bottoms. This shaft has a universal joint 27 at its forward end by means of which it is drivingly connected to a propeller shaft 28 that may comprise telescoping parts. The propeller shaft itself has a universal joint 30 and this provides means for effecting connection with the power take off of the tractor as generally indicated by dot-dash line 32. In cases where the power take off is at the extreme rear end of the tractor, as indicated at 34 in FIGURE 1, chain and sprocket means 36 can be availed of for effecting connection with propeller shaft 28. In this last mentioned case, a suitable supporting frame would carry another sprocket of the chain and sprocket system in the region of the propeller shaft, and to this last mentioned sprocket the propeller shaft would be connected. The particular manner of driving propeller shaft 28 and shaft 24 is not important except that it is driven in rotation at some predetermined speed during a plowing operation.

As will be seen in FIGURES 2 and 3, shaft 24 is supported in bearings 38, preferably of a self-aligned type and which bearings are carried on the lower ends of vertical support bars 40 which, at their upper ends engage a part of the plow frame, a beam, for example. Means such as U-bolts 44 can be provided for fixedly but adjustably connecting the support bars 40 to the plow frame. Support bars 40 would generally be twisted as shown in FIGURE 3 so that the upper ends thereof could engage the plow frame while the lower ends support bearings 38 so as to hold shaft 24 in its proper position.

In the region in front of each plow bottom, shaft 24 carries a device operable as the shaft rotates to knock trash away from in front of the pertaining plow bottom. This device advantageously takes the form illustrated in the drawings wherein it will be seen that two plates 46 and 48 are placed on opposite sides of shaft 24 and have their ends interconnected by bolts 50. Bolts 50 are also availed of for connecting the inner ends of short chain links 52 to the plates 46 and 48. As shown, about three links an inch and a quarter to an inch and three quarters in length form a usable chain link, and there could be more or fewer of the chain links if so desired. The advantage of having flexible beater elements such as the chain links illustrated is that these elements will yield upon striking an obstruction and therefore will not break or cause twisting off of shaft 24 or propeller shaft 28, or damage to the supporting structure for shaft 24.

I have found a single beater in advance of each plow bottom to do an adequate clearing job, but more of the beaters could be mounted on shaft 24 if desired. In general, it is satisfactory for the beater device merely to be clamped to shaft 24 by the tightening of bolts 50, and this will permit shifting of the individual beater devices along shaft 24 to position them in the most effective position in front of the individual plow bottoms. In cases where the clearing attachment according to the present invention forms a permanent part of a plow structure, the location of the beater devices can be fixed as by drilling through plates 46 and 48 and the shaft 24 and by placing a bolt or pin 54 through the resulting hole 56 and the hole in the shaft 24 (not shown) to secure the beaters on the shaft 24.

FIGURE 2 shows how the shaft 24 rotates so that the beater device in front of each plow share rotates to knock away trash in front of the plow bottom. As shown, the device below shaft 24 is turning toward the front of the plow and above shaft 24 is turning toward the back. This direction of rotation produces the best results.

The clearing attachment according to the present invention can be used on any type plow in which the shaft can be rotated. Thus, the device can be used for plows having any number of plow bottoms from one on up. The device runs relatively light and takes little power from the tractor and the shaft 24 can be whatever length is necessary to extend in front of the plow bottoms of the plow.

Where the vegetation or trash is extremly heavy, the shaft 24 can be rotated at high speed, up to several hundred r.p.m., but where the vegetation and trash conditions are not extreme, shaft 24 can be rotated at reduced speed, say 100 r.p.m. or so. Where trash or vegetation is no problem, the clearing shaft can be held stationary and it will not in any way interfere with plowing operations being carried out.

The clearing attachment according to the present invention is of such a nature that the plow structure does not have to be modified in any way to receive the clearing attachment. The plow bottoms in their respective coulter wheels are not interfered with in any way, and a covering attachment such as was referred to previously, can be mounted at the top of the plow mold board, and these covering attachments and the clearing device according to the present invention will not in any way interfere with each other.

Because of its ease of assembly with all types of plow structures, the clearing attachment according to the present invention can be incorporated in new manufacture and can easily be adapted to any existing plow structure without any difficulties whatsoever.

It will be understood that this invention is susceptible to modification in order to adapt it to different usages and conditions; and accordingly, it is desired to comprehend such modifications within this invention as may fall within the scope of the appended claims.

What is claimed is:

1. A plow having beam means and a plurality of moldboard plows mounted on said beam means in echelon defining an angle with respect to the direction of movement of the plow, and means for preventing trash and vegetation from accumulating on the plow comprising a shaft mounted on the plow at substantially said angle forward and above and at a predetermined distance from said moldboard plows, flexible flail-like elements having a length less than said predetermined distance mounted on the shaft in spaced relation to the moldboard plows, and means for rotating said shaft to cause said elements to drive trash and vegetation away from said moldboard, said elements being chains of light weight construction and adapted to be rotated at high speeds, compared to the speed of said plow in the direction of movement.

2. A plow having beam means and a plurality of moldboard plows mounted on said beam means in echelon defining an angle with respect to the direction of movement of the plow, and means for preventing trash and vegetation from accumulating on the plow comprising a shaft mounted on the plow at substantially said angle forward and above and at a predetermined distance from said moldboard plows, flexible flail-like elements having a length less than said predetermined distance mounted on the shaft in spaced relation to the moldboard plows, and means for rotating said shaft to cause said elements to drive trash and vegetation away from said moldboard, the direction of rotation of said shaft causing said elements to move in the forward direction below said shaft, said flail-like elements and said shaft being of light weight construction enabling said flail-like elements to be rotated at high speeds to beat said trash and vegetation and break the same to drive the same away from said moldboard.

3. A plow having beam means and a plurality of moldboard plows mounted on said beam means in echelon defining an angle with respect to the direction of movement of the plow, and means for preventing trash and vegetation from accumulating on the plow comprising a shaft mounted on the plow at substantially said angle forward and above and at a predetermined distance from said moldboard plows, flexible flail-like elements having a length less than said predetermined distance mounted on the shaft to rotate therewith in spaced relation to the moldboard plows, and means for rotating said shaft to cause said elements to drive trash and vegetation away from said moldboard plows, the direction of rotation of said shaft causing said elements to move in the forward direction below said shaft, each said element comprising a length of chain having one terminal link connected to said shaft, said flail-like elements being flexible and unobstructive to the normal plowing operation when said shaft is not rotated and said flail-like elements being brought into an effective radially aligned position about said shaft when said shaft is rotated.

4. In a tractor drawn plow having beam means and a plurality of moldboard plows mounted on said beam means in echelon defining an angle with respect to the direction of movement of the plow, and means for preventing trash and vegetation from accumulating on the plow comprising a shaft of light weight construction mounted on the plow at substantially said angle forward and above and at a predetermined distance from said moldboard plows, flexible flail-like elements having a length less than said predetermined distance in the form of chains mounted on the shaft in spaced relation to the moldboard plows, and means for rotating said shaft at speeds of at least approximately 100 r.p.m. to cause said elements to drive trash and vegetation away from said moldboard, the direction of rotation of said shaft causing said elements to move in the forward direction below said shaft, said plow including a support frame, bracket means dependent therefrom, and self aligning bearing means on the lower end of said bracket means rotatably supporting said shaft, means for attaching a tractor to said plow, and means for connecting said shaft to the power take off of said tractor.

5. In a tractor drawn plow having beam means and a plurality of moldboard plows mounted on said beam means in echelon defining an angle with respect to the direction of movement of the plow, the improvement consisting of means for preventing trash and vegetation from accumulating on the plow comprising a shaft mounted on the plow at substantially said angle forward and above and at a predetermined distance from said moldboard plows, flexible flail-like elements having a length less than said predetermined distance mounted on the shaft to rotate therewith in spaced relation to the moldboard plows, and means for rotating said shaft to cause said elements to drive trash and vegetation away from said moldboard plows, the direction of rotation of said shaft causing said elements to move in the forward direction below said shaft, said plow including a support frame, bracket means dependent therefrom, and self aligning bearing means on the lower end of said bracket means rotatably supporting said shaft, means for attaching a tractor to said plow, a flexible propeller shaft means at one end of said shaft, and means for connecting said propeller shaft means to the power take off of the said tractor, said flail-like elements and said shaft being of light weight construction enabling said flail-like elements to be rotated at high speeds to beat said trash and vegetation and break the same to drive the same away from said moldboard.

(References on following page)

References Cited by the Examiner

UNITED STATES PATENTS

| | | | |
|---|---|---|---|
| 449,669 | 4/1891 | Demers | 172—66 |
| 567,475 | 9/1896 | Hindermeier | 172—66 |
| 1,225,268 | 5/1917 | Paterson | 172—71 |
| 1,369,431 | 2/1921 | Hicks | 172—66 X |
| 1,552,750 | 9/1925 | Lain | 172—66 X |
| 1,553,205 | 9/1925 | Toth | 172—66 X |
| 1,846,323 | 2/1932 | Elmore | 172—66 X |
| 2,242,479 | 5/1941 | Panengen | 172—66 |
| 2,638,042 | 5/1953 | Barstow et al. | 172—103 X |
| 3,015,188 | 1/1962 | Reinecker et al. | 172—45 X |
| 3,042,118 | 7/1962 | Norris | 172—1 |

FOREIGN PATENTS 1,079   4/1860   Great Britain.

ABRAHAM G. STONE, *Primary Examiner.*

F. B. HENRY, *Assistant Examiner.*